US012500924B2

(12) United States Patent
Roundy et al.

(10) Patent No.: US 12,500,924 B2
(45) Date of Patent: Dec. 16, 2025

(54) PROTECTING AGAINST MALICIOUS WEBSITES USING REPETITIVE DATA SIGNATURES

(71) Applicant: Gen Digital Inc., Tempe, AZ (US)

(72) Inventors: Kevin Alejandro Roundy, El Segundo, CA (US); Platon Kotzias, Athens (GR); Iskander Sanchez Rola, Antibes (FR); Michalis Pachilakis, Dublin (IE); Leylya Yumer, Antibes (FR); Acar Tamersoy, Culver City, CA (US)

(73) Assignee: GEN DIGITAL INC., Tempe, AZ (US)

( * ) Notice: Subject to any disclaimer, the term of this patent is extended or adjusted under 35 U.S.C. 154(b) by 193 days.

(21) Appl. No.: 18/487,700

(22) Filed: Oct. 16, 2023

(65) Prior Publication Data

US 2025/0080573 A1 Mar. 6, 2025

(51) Int. Cl.
*H04L 9/40* (2022.01)

(52) U.S. Cl.
CPC ...... *H04L 63/1441* (2013.01); *H04L 63/1425* (2013.01)

(58) Field of Classification Search
CPC ............ H04L 63/1441; H04L 63/1425; H04L 63/1416; G06F 21/566; G06F 21/554
See application file for complete search history.

(56) References Cited

U.S. PATENT DOCUMENTS

| 8,806,629 | B1 * | 8/2014 | Cherepov | ........... H04L 63/1416 726/25 |
| 9,208,316 | B1 * | 12/2015 | Hill | ..................... H04L 63/1416 |
| 11,431,738 | B2 * | 8/2022 | Jeyakumar | ............. G06N 20/20 |
| 2008/0288515 | A1 * | 11/2008 | Kim | ........................ G06Q 10/10 |
| 2009/0049550 | A1 * | 2/2009 | Shevchenko | ........... G06F 21/52 726/23 |

(Continued)

OTHER PUBLICATIONS

Shibahara et al., "Detecting Malicious Websites by Integrating Malicious, Benign, and Compromised Redirection Subgraph Similarities," 2017 IEEE 41st Annual Computer Software and Applications Conference (COMPSAC) Year: 2017 | Conference Paper | Publisher: IEEE.*

(Continued)

*Primary Examiner* — Roderick Tolentino
(74) *Attorney, Agent, or Firm* — MASCHOFF BRENNAN

(57) ABSTRACT

Methods for protecting against malicious websites using repetitive data signatures are disclosed. Some embodiments may identify known malicious websites and known safe websites. A first dataset containing data from one or more artifacts within the known malicious websites and a second dataset containing data from the one or more artifacts within the known safe websites may be created. One or more signatures may be identified from the first dataset. A first frequency of signature repetition within the first dataset and a second frequency of signature repetition within the second dataset may be determined. A level of confidence may be determined based on the frequencies. If a rule establishment threshold for confidence is met or exceeded, a rule may be established that websites containing the one or more signatures are malicious. The rule may be applied to identify a new malicious website. A security action may also be performed.

20 Claims, 4 Drawing Sheets

(56) References Cited

U.S. PATENT DOCUMENTS

| | | | | |
|---|---|---|---|---|
| 2010/0037317 | A1* | 2/2010 | Oh | G06F 21/554 |
| | | | | 726/23 |
| 2016/0241589 | A1* | 8/2016 | Liu | H04L 63/168 |
| 2019/0075123 | A1* | 3/2019 | Smith | G06N 3/006 |
| 2021/0266339 | A1* | 8/2021 | Moshitzky | H04L 63/0254 |
| 2022/0038496 | A1* | 2/2022 | Swanson | H04L 63/1416 |

OTHER PUBLICATIONS

McGahagan et al., "A Comprehensive Evaluation of HTTP Header Features for Detecting Malicious Websites," 2019 15th European Dependable Computing Conference (EDCC) Year: 2019 | Conference Paper | Publisher: IEEE.*

Matic, S., Kotzias, P. and Caballero, J., 2015, October. Caronte: Detecting location leaks for deanonymizing tor hidden services. In Proceedings of the 22nd ACM SIGSAC Conference on Computer and Communications Security (pp. 1455-1466).

Kotzias, P., Matic, S., Rivera, R., & Caballero, J. (Oct. 2015). Certified PUP: abuse in authenticode code signing. In Proceedings of the 22nd ACM SIGSAC Conference on Computer and Communications Security (pp. 465-478).

Starov, O., Zhou, Y., Zhang, X., Miramirkhani, N. and Nikiforakis, N., 2018, April. Betrayed by your dashboard: Discovering malicious campaigns via web analytics. In Proceedings of the 2018 World Wide Web Conference (pp. 227-236).

* cited by examiner

PROTECTING AGAINST MALICIOUS WEBSITES USING REPETITIVE DATA SIGNATURES

BACKGROUND

Online scams often utilize malicious websites that mimic safe websites in order to dupe those who interact with their websites into downloading software, purchasing products, inputting personal information, or other acts that may be harmful and/or fraudulent. malicious websites, including scam websites, can have devastating consequences for consumers including financial losses, identity theft, device disruption, emotional distress, and potentially even legal troubles. In fact, Americans lost $10.3 billion to internet scams in 2022 alone. Scam websites may also deter consumers from utilizing safe websites out of fear of falling victim to a scam, which may negatively impact legitimate businesses.

The actors behind these malicious sites are often adept at mimicking safe websites, and these malicious websites often include artifacts such as "about us" pages, "contact us" pages, payment processing pages, frequently asked question (FAQ) pages, privacy policy pages, or other pages common to safe websites to make the site appear to be legitimate to the consumer. This content makes it difficult for the consumer to determine whether the website is safe or malicious. Because the malicious nature of these websites is often not readily apparent, detecting these websites and notifying the consumer of their malicious nature is essential to avoid online scams.

The subject matter claimed herein is not limited to embodiments that solve any disadvantages or that operate only in environments such as those described above. Rather, this background is only provided to illustrate one example technology area where some embodiments described herein may be practiced.

SUMMARY

In one embodiment, a computer-implemented method for protecting against malicious websites using repetitive data signatures may be performed, at least in part, by a computing device including one or more processors. The method may include identifying a group of known malicious websites, identifying a group of known safe websites, creating a first dataset containing data associated with one or more artifacts from each website within the group of known malicious websites, creating a second dataset containing data associated with the one or more artifacts from each website within the group of known safe websites, identifying one or more signatures from the first dataset, determining a first frequency with which the one or more signatures, alone or in combination, are repeated within the first dataset and a second frequency with which the one or more signatures, alone or in combination, are repeated within the second dataset, determining a level of confidence based on the first and second frequencies, establishing a rule that websites containing the one or more signatures are malicious when the level of confidence meets or exceeds a rule establishment threshold, applying the rule to identify a new malicious website, and performing a security action relating to the new malicious website.

In some embodiments, the one or more artifacts may include content from a web page. In these embodiments, the web page may be an "about us" type web page that provides general information about the website and the one or more signatures may include a portion of text used in the web page. Additionally or alternatively, the web page may be a "contact us" type web page that provides location information relating to the website and the one or more signatures may include an email address, phone number, or a physical address. Additionally or alternatively, the web page may be a payment processing web page and the one or more signatures may include a payment processing account. In embodiments where the one or more signatures are a payment processing account, the payment processing account may be a PayPal® account. Additionally or alternatively, the web page may be a "frequently asked questions" page and the one or more signatures may include a portion of text used in the web page. Additionally or alternatively, the web page may publish a privacy policy and the one or more signatures may include a portion of text used in the privacy policy.

In some embodiments, the one or more artifacts may include code used to create the website and the one or more signatures may include a Hypertext Markup Language (HTML) template. In some embodiments, the one or more artifacts may include a Transport Layer Security (TLS) certificate and the one or more signatures may comprise a public/private key pair for signing the TLS certificate. In some embodiments, the one or more artifacts may include code used to create the website and the one or more signatures may include an identifier for a web analytics client.

In some embodiments, the security action may include providing a notification on a device that is attempting to access the new malicious website. In some embodiments, the security action may include preventing a device from accessing the new malicious website. In some embodiments, the security action may include preventing a user from entering data into the new malicious website. In some embodiments, the security action may include preventing a transaction from occurring on the new malicious website.

In some embodiments, the rule establishment threshold is at least 95%. In some embodiments, a single signature may be identified from the first dataset and the rule may be established based on the level of confidence determined for websites containing the single signature meeting or exceeding the rule establishment threshold. In some embodiments, at least two signatures may be identified from the first dataset and the rule may be established based on the level of confidence determined for websites containing the at least two signatures meeting or exceeding the rule establishment threshold. In these embodiments, the method may further include confirming that a level of confidence for each of at least two signatures meet or exceed a signature combination threshold.

In some embodiments, one or more non-transitory computer-readable media may comprise one or more computer-readable instructions that, when executed by one or more processors of a computing device, cause the computing device to perform a method for protecting against malicious websites using repetitive data signatures.

In some embodiments, a computing device comprising one or more processors and one or more non-transitory computer-readable media comprising one or more computer-readable instructions that, when executed by the one or more processors, may cause the computing device to perform a method for protecting against malicious websites using repetitive data signatures.

It is to be understood that both the foregoing summary and the following detailed description are explanatory and are not restrictive of the invention as claimed.

BRIEF DESCRIPTION OF THE DRAWINGS

Embodiments will be described and explained with additional specificity and detail through the use of the accompanying drawings, in which.

DETAILED DESCRIPTION

Figure 1:
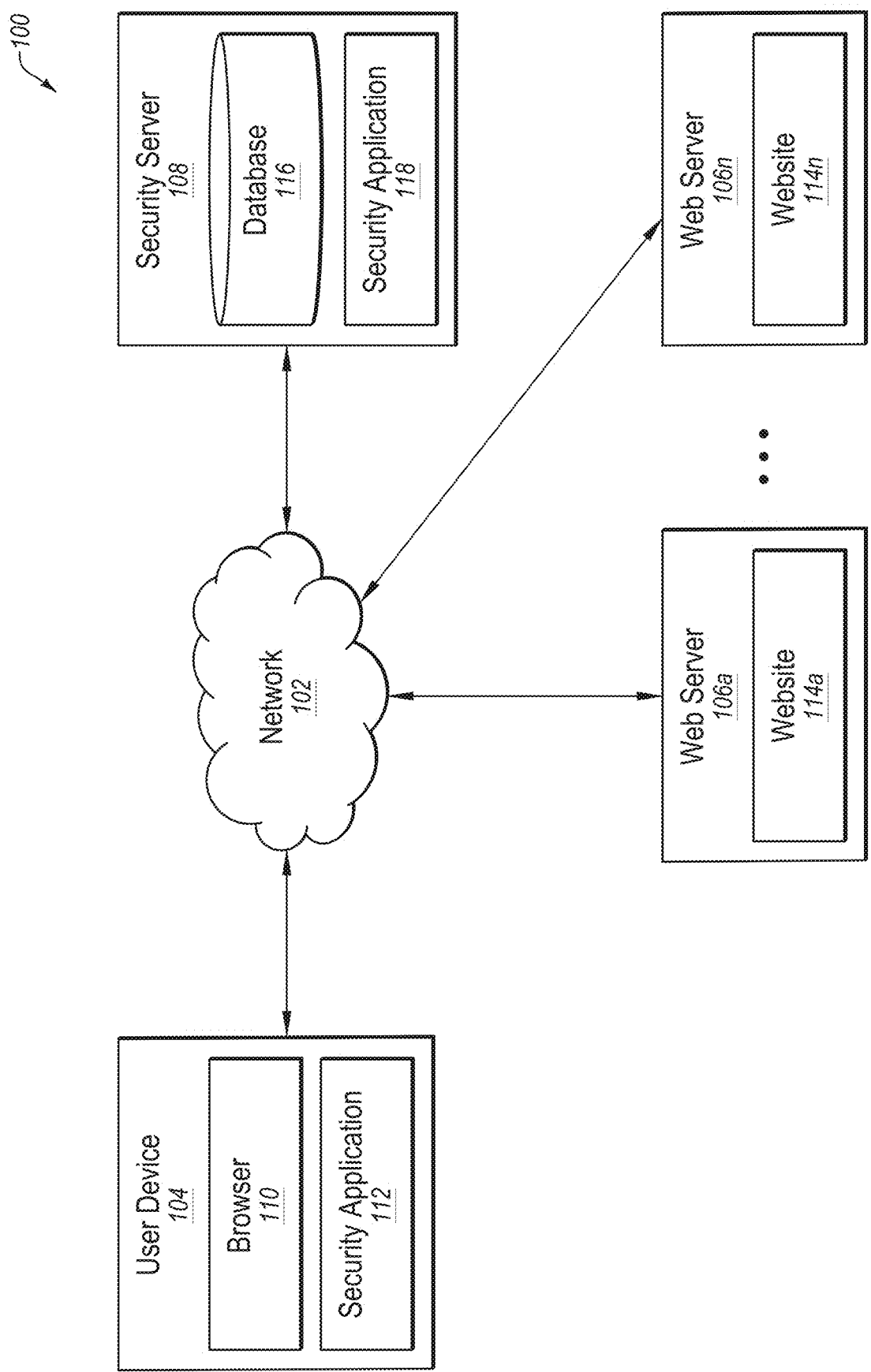
FIG. 1 illustrates an example system configured for protecting against malicious websites using repetitive data signatures.

Legitimate websites often include web content such as "about us" pages, "contact us" pages, frequently asked question (FAQ) pages, and privacy policy pages. Ecommerce websites also include one or more payment processing pages. Malicious websites, which include fraudulent ecommerce websites as well as websites that install harmful software such as malware, ransomware, spyware, etc., often include similar web content that makes it difficult for consumers to distinguish between a malicious website and a safe website without making further inquiry.

New malicious websites are constantly being created and, while there exist conventional solutions for identifying malicious websites, many of these solutions rely on feedback from individuals who have visited the websites and fallen victim to whatever malicious objective is implemented by the website. Thus, conventional solutions for identifying malicious websites may not prevent damage entirely, especially for those individuals that visit these websites before conventional solutions have identified them as malicious. In addition, there are so many malicious websites on the Internet, that even the most reliable identification solutions are not perfect.

Despite the large number of malicious websites on the Internet, there is a much smaller number of individuals and entities that are responsible for operating these malicious websites. For this reason, scammer groups or actors often duplicate code and content artifacts across the malicious websites that they operate. For example, a scammer may reuse text and/or images on "about us" pages, FAQ pages, and privacy policy pages. A scammer may also use the same contact information on the "contact us" page in multiple malicious websites and may use the same payment processing accounts across multiple pages from different websites. In another example, the malicious websites may use the same underlying HTML template with only superficial differences or the scammer may reuse web analytics identifiers to monitor statistics across multiple websites. Additionally, the TLS certificates may be different for each website, but the websites may use the same public/private key pair for signing the TLS certificates in order to aid the scammer in managing many different certificates associated with many different websites.

Leveraging repetitive signatures in these artifacts, embodiments disclosed herein may identify malicious websites and protect devices from these malicious websites through their use of one or more of these repeated signatures. In particular, some embodiments may identify a group of known malicious websites and a group of known safe websites. A first dataset containing data associated with one or more artifacts from within the group of known malicious websites and a second dataset containing data associated with the one or more artifacts from within the group of known safe websites may be created. One or more signatures may be identified from the first dataset. A first frequency with which the one or more signatures, alone or in combination, are repeated within the first dataset may be determined, and a second frequency with which the one or more signatures, alone or in combination, are repeated within the second dataset may be determined. A level of confidence may be determined based on the first and second frequencies. When the level of confidence meets or exceeds a rule establishment threshold, a rule may be established that websites containing the one or more signatures are malicious. The rule may be applied to identify new malicious websites, and a security action related to the new malicious websites may be performed.

Turning to the figures, FIG. 1 illustrates an example system configured for protecting against malicious websites using repetitive data signatures. The system 100 may include a network 102, a user device 104, web servers 106a-106n, and a security server 108.

In some embodiments, the network 102 may be configured to communicatively couple the user device 104, the web servers 106a-106n, and the security server 108. In some embodiments, the network 102 may be any wired or wireless network, or combination of multiple networks, configured to send and receive communications between systems and devices. In some embodiments, the network 102 may include a Personal Area Network (PAN), a Local Area Network (LAN), a Metropolitan Area Network (MAN), a Wide Area Network (WAN), a Storage Area Network (SAN), a cellular network, the Internet, or some combination thereof.

Figure 4:
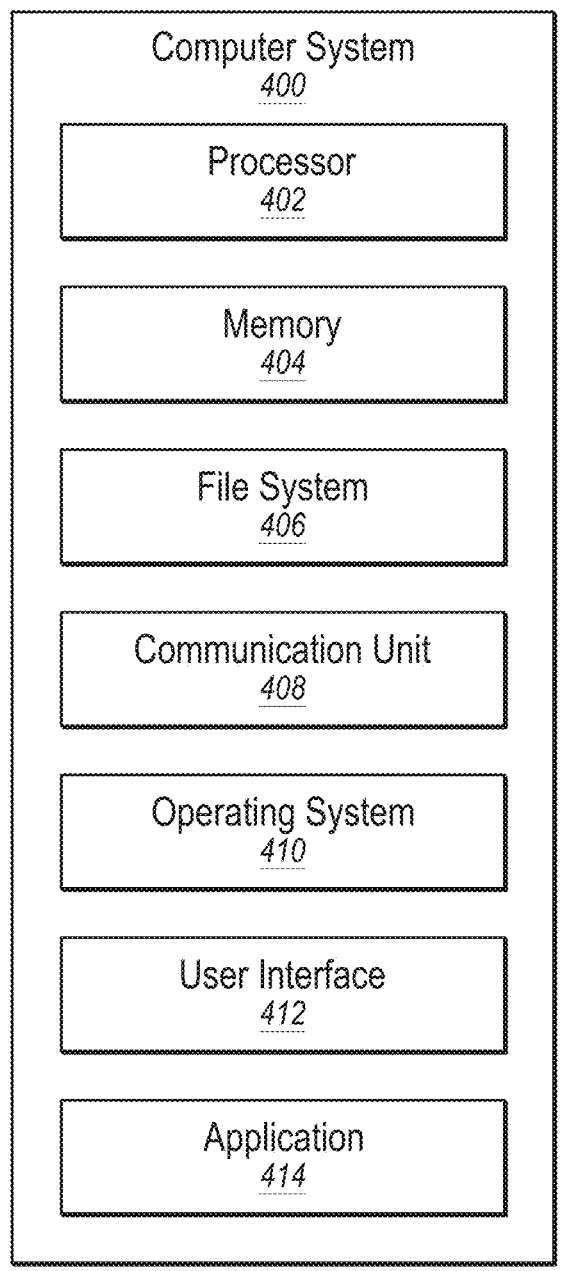
FIG. 4 illustrates an example computer system that may be employed in protecting against malicious websites using repetitive data signatures.

In some embodiments, the user device 104 may be any computer system capable of communicating over the network 102 and capable of accessing websites, examples of which are disclosed herein in connection with the computer system 400 of FIG. 4. The user device 104 includes a browser 110 and a security application 112. The browser 110 may enable the user device 104 to access websites through the network 102. As provided in more detail hereafter, the security application 112 may perform one or more steps for identifying malicious websites and performing a security action related to the malicious websites.

In some embodiments, the web servers 106a-106n may be any computer systems capable of communicating over the network 102, examples of which are disclosed in connection herein in connection with the computer system 400 of FIG. 4. The web servers 106a-106n include websites 114a-114n, which may be accessed by the user device 104 through the browser 110.

In some embodiments, the security server 108 may be any computer system capable of communicating over the network 102, examples of which are disclosed in connection with the computer system 400 of FIG. 4. The security server 108 includes a database 116 and a security application 118. The database 116 may store artifacts and signatures that are associated with malicious websites. Like the security application 112, the security application 118 may perform one or more steps for identifying malicious websites and performing a security action related to the malicious websites.

To detect malicious websites using repeating data signatures, the security applications 112 and/or 118 may first identify a group of websites that include known malicious websites and known safe websites. For example, the websites 114a-114n may include some websites that have already been identified as malicious and some websites that have already been identified as safe. A website may be malicious for any number of different reasons. For example, a website may be malicious because it installs harmful software, such as malware, spyware, ransomware, etc. on the devices that visit the website. Alternatively, a website may be malicious because it is a fraudulent ecommerce website.

Once this group of known websites has been obtained, the security applications 112 and/or 118 may create a first dataset containing data associated with one or more artifacts from each website within the group of known malicious websites. The security applications 112 and/or 118 may create a second dataset containing data associated with the one or more artifacts from each website within the group of known safe websites.

Artifacts from these websites may include any code or content that is used on the websites. For example, an artifact may include content from an "about us" type web page that provides general information about the website and/or content from a "contact us" type web page that provides location information relating to the website. An artifact may also include content from a payment processing web page and/or content from a "frequently asked questions" type web page. In addition, an artifact may include content from a privacy policy for the website and/or the code used to create the website and/or a Transport Layer Security (TLS) certificate for the website.

Once these datasets are created, the security applications 112 and/or 118 may identify one or more signatures from the first dataset. Signatures may be parts or portions of the artifacts obtained. For example, a signature may include a portion of text within a web page, an email address or physical address or phone number, a payment processing account used, a Hypertext Markup Language (HTML) template, a key pair for a TLS certificate, or an identifier for a web analytics client.

Once one or more signatures are identified within the artifacts, the security applications 112 and/or 118 may determine a first frequency with which the one or more signatures, alone or in combination, are repeated within the first dataset and may determine a second frequency with which the one or more signatures, alone or in combination, are repeated within the second dataset. The security applications 112 and/or 118 may then determine a level of confidence based on the first and second frequencies. This level of confidence may represent the likelihood that websites containing the signature are malicious. When the level of confidence meets or exceeds a rule establishment threshold, the security applications 112 and/or 118 may establish a rule that websites containing the signature are malicious.

The security applications 112 and/or 118 may then apply the rule to identify new malicious websites. Once a new website has been identified as malicious, the security applications 112 and/or 118 may perform a security action related to the new malicious website. In some embodiments, a security action may include providing a notification on a device that is attempting to access the new malicious website, or preventing a device from accessing the new malicious website, or preventing a user from entering data into the new malicious website, or preventing a transaction from occurring on the new malicious website.

Modifications, additions, or omissions may be made to the system 100 without departing from the scope of the present disclosure. For example, in some embodiments, the system 100 may include additional components similar to the components illustrated in FIG. 1 such that each may be configured similarly to the components illustrated in FIG. 1. For example, in some embodiments, a system 100 configured for protecting consumers from malicious websites may only include a single security application. In other embodiments, the steps performed by a security application may be split between two or more security applications. For example, with regard to the system 100, the security application 112 may perform all of the functions necessary to protect against malicious websites using repetitive data signatures, thus rendering the security application 118 superfluous. In other embodiments, the security application 118 may perform all of the functions necessary to protect against malicious websites using repetitive data signatures, thus rendering the security application 112 superfluous. Alternatively still, the functions necessary to protect against malicious websites using repetitive data signatures may be split between the security application 112 on the user device 104 and the remote security application 118 on the security server 108.

Figure 2:
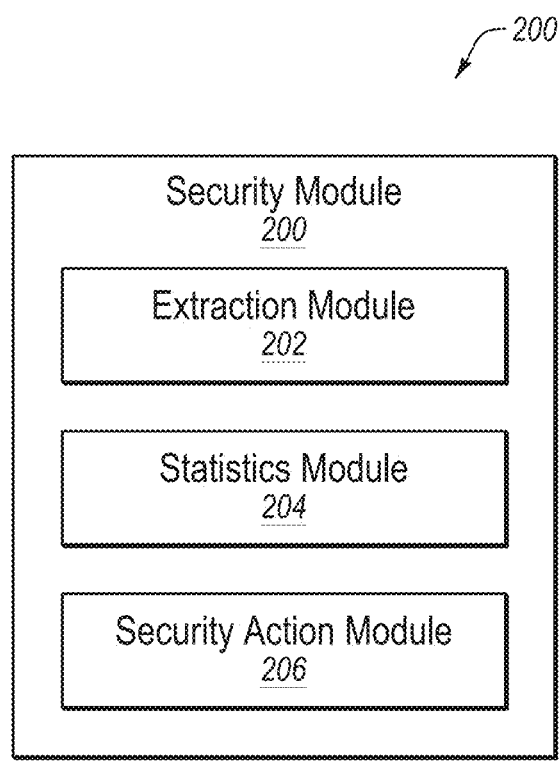
FIG. 2 illustrates an example security application.

FIG. 2 illustrates an example security application 200. The security application 200 may be, for example, one or both of the security applications 112 and 118 illustrated in FIG. 1. The security application 200 includes an extraction module 202, a statistics module 204, and a security action module 206.

The extraction module 202 may identify a group of websites that include known malicious websites and known safe websites. In some embodiments, a website reputation tool may be used to determine which websites are malicious and which websites are safe within the group of websites.

The extraction module 202 may extract one or more artifacts from the group of known malicious websites and the group of known safe websites. In some embodiments, the one or more artifacts may be content elements or web content. In these embodiments, the one or more artifacts may be "about us" pages, "contact us" pages, payment processing pages, FAQ pages, and/or Privacy Policies. In some embodiments, the one or more artifacts may be code elements. In these embodiments, the one or more artifacts may be code used to create the website, a TLS certificate, and/or other code elements. In some embodiments, the one or more artifacts may be code elements and content elements.

The extraction module 202 may create a first dataset containing data associated with the one or more artifacts from each website within the group of known malicious websites. For example, the extraction module may create a first dataset containing data associated with extracted "contact us" pages and "about us" pages, etc. from within the group of known malicious websites. The extraction module 202 may create a second dataset containing data associated with the one or more artifacts from each website within the group of known safe websites. For example, the extraction module 202 may create a second dataset containing data associated with extracted "contact us" pages and "about us" pages, etc. from within the group of known safe websites.

The extraction module 202 may then identify one or more signatures from the first dataset. In some embodiments, the extraction module 202 may identify one or more signatures by extracting visible text, images, payment processing accounts, website code, unique identifiers of code used for web analytics, public/private key pairs for TLS certificates, and/or other identifying characteristics from the first dataset. For example, the extraction module may extract a phone number, address, and/or email address from a contact us page from one of the websites in the group of known malicious websites. In embodiments where the signature includes a portion of text, the text portions may be headers, sentences, paragraphs, or other blocks of text that are sufficiently long or distinctive as to decrease the chance that the text will recur randomly in the group of known safe websites or in unlabeled, safe websites.

In embodiments where the artifact is an about us page, the signature may be a portion of text used in the web page. In embodiments where the artifact is a contact us page, the signature may be a physical address, phone number, email address, fax number, or other contact information. In embodiments where the artifact is a payment processing page, the signature may be a payment processing account (e.g., a PayPal® account). In embodiments where the artifact is an FAQ page, the signature may be a portion of text used in the web page. In embodiments where the artifact is a privacy policy, the signature may be a portion of text used in the privacy policy. In embodiments where the artifact is code used to create the website, the signature may be an HTML template and/or an identifier for a web analytics client. In embodiments where the artifact is a TLS certificate, the signature may be a public/private key pair for signing the TLS certificate.

The statistics module 204 may determine a first frequency with which the one or more signatures, alone or in combination, are repeated within the first dataset and a second frequency with which the one or more signatures, alone or in combination, are repeated within the second dataset. In some embodiments, the statistics module 204 may search for signature matches throughout the first and the second datasets to determine the number of times that the one or more signatures appear, alone or in combination, in the known safe and known malicious websites. For example, the one or more signatures may be a phone number from a contact us page and the statistics module 204 may search for matches of that phone number throughout the first and the second datasets. In some embodiments, the statistics module 204 may search for exact matches and/or the statistics module 204 may search for close matches within the first and second datasets. For example, if the signature is a paragraph from an about us page and the statistics module 204 finds a paragraph in another website's about us page that is a 99% match (e.g., it has 100 words and 99 match the signature) then the statistics module 204 may consider that to match the signature. In some embodiments, the statistics module 204 may discard signatures that are unique to a single known malicious website or that have a high probability of occurring by random chance (e.g., phrases that are very brief or incompletely specified addresses indicating a city without a street name).

In some embodiments, the first frequency with which the one or more signatures, alone or in combination, is repeated within the first dataset may be the support of the one or more signatures. If a rule containing the one or more signatures is established, the first frequency with which the one or more signatures, alone or in combination, is repeated within the first dataset may be the support of the rule. For example, if the signature is found twenty times within the group of known malicious websites (the first dataset) and is found five times within the group of known safe websites (the second dataset), the signature may have a support of twenty. In the preceding example, if the signature is established as a rule, the rule will have a support of twenty.

The statistics module 204 may determine a level of confidence based on the first and second frequencies. In some embodiments, the statistics module 204 may determine a level of confidence for a single signature alone. In these embodiments, the level of confidence may be measured by the first frequency with which the signature is repeated within the first dataset divided by the sum of the first frequency and the second frequency with which the signature is repeated within the second dataset. In other words, the level of confidence may be determined by the following equation where $f_1$ is the first frequency (# of matches among the group of known malicious websites) and $f_2$ is the second frequency (number of matches among the group of known safe websites).

$$\text{Confidence}_{One\ Signature} = \frac{(f_1)}{(f_1 + f_2)} = \frac{\text{Malicious Matches}}{\text{Total Matches}}$$

For example, the signature may be an address from a "contact us" page and the signature may appear fifty times in both the first and second datasets and forty of those fifty may be matches on known malicious sites in the first dataset. Hence, the first frequency would be forty, the second frequency would be ten, and the confidence would be 40/(40+10)=0.8 or 80% meaning that if the signature appears in a new, unlabeled website that there would be 80% confidence in identifying that new, unlabeled website as malicious. This example is demonstrated in the first row of Table 1 below.

In some embodiments, the statistics module 204 may determine the level of confidence for a signature in combination with other signatures. In these embodiments, the level of confidence may be measured by the first frequency with which two or more signatures are repeated together in a single website within the first dataset divided by the sum of the first frequency and the second frequency with which two or more signatures are repeated together in a single website within the second dataset. In other words, the level of confidence may be determined by the following equation where $f1_{1,\ 2,\ \ldots,\ n}$ is the first frequency (number of matches in the first dataset where the two or more signatures are present together) and $f2_{1,\ 2,\ \ldots,\ n}$ is the second frequency (number of matches in the second dataset where the two or more signatures are present together):

$$\text{Confidence}_{S_{1,2,\ldots,n}} = \frac{(f1_{1,2,\ldots,n})}{((f1_{1,2,\ldots,n}, + f2_{1,2,\ldots,n})} = \frac{\text{Malicious Matches of Combined Signatures}}{\text{Total Matches of Combined Signatures}}$$

For example, the first signature may be an address from a "contact us" page and the second signature may be a payment processing account. The first signature may have fifty matches in the first and the second datasets total, and forty of those fifty matches may be in known malicious websites, which means that ten matches would be on known safe websites. Thus, the first signature's confidence level, by itself, would be 0.8 or 80% (40/50). The second signature may have one hundred matches in the first and second datasets total, and ninety of those one hundred matches may be in known malicious sites, which means that ten matches would be on known safe websites. Thus, the second signature's confidence level, by itself, would be 0.9 or 90% (90/100).

However, the two signatures may be combined to increase the confidence that a website identified as malicious is in fact malicious. Hence, the statistics module 204 may search for instances where the two signatures appear in the first and the second dataset together (e.g., both signatures are on the same website). In this example, the first and second signature may appear together thirty times in the first and second dataset and all thirty of those matches may be on known malicious sites in the first dataset, which results in a level of confidence of 1 or 100% (30/30). Thus, by combining the rules, the confidence that a website containing both the first signature and the second signature is malicious may be greater than the confidence in the first signature or the second signature individually. This example is demonstrated in Table 1 below.

TABLE 1

Level of Confidence Determination - Alone and Combined

| Signature | First Frequency (Support) | Second Frequency | Frequency in First and Second Database | Level of Confidence |
|---|---|---|---|---|
| Address | 40 | 10 | 50 | 80% |
| Payment Processing Account | 90 | 10 | 100 | 90% |
| Address AND Payment Processing Account | 30 | 0 | 30 | 100% |

The statistics module 204 may then establish a rule that websites containing the one or more signatures are malicious when the level of confidence meets or exceeds a rule establishment threshold. The rule establishment threshold may be any threshold. For example, the rule establishment threshold may be at least 80%, or at least 85%, or at least 90%, or at least 95%. The statistics module 204 may establish a rule that a website containing a specific payment processing account is malicious if the level of confidence for this signature is, for example, at least 95%. In some embodiments, the rule establishment threshold may be 100% confidence. In another example, the statistics module 204 may establish a rule that a website containing a specific payment processing account (first signature) and a specific address (second signature) is malicious if the level of confidence for these signatures together is for example, at least 90%.

In addition to a rule establishment threshold, a rule support threshold may also be required. For example, in one embodiment, for a rule to be established, the rule establishment threshold may be at least 98% and the rule support threshold may be five. Hence, in the preceding example, there would have to be a confidence of at least 98% and at least five instances of the one or more data signatures must be present in the first dataset for a rule to be established.

In some embodiments where the rule contains two or more signatures, the statistics module 204 may only establish the rule if the confidence level of each signature, by itself, meets or exceeds a signature combination threshold. In these embodiments, a signature may only be considered for combination with another signature if that signature independently meets or exceeds the signature combination threshold for confidence. This signature combination threshold may be any threshold. For example, the signature combination threshold may be at least 85% or at least 85% or more.

In one embodiment, the signature combination threshold may be at least 80% and the rule establishment threshold may be at least 95%. Signature one may have a level of confidence of 100%, signature two may have a level of confidence of 94%, signature three may have a level of confidence of 90%, and signature four may have a level of confidence of 70%. Signature one may be established as a rule by itself because signature one alone meets the rule establishment threshold. Neither signature two, signature three, nor signature four meet the rule establishment threshold, and thus a rule is not established for these signatures alone. However, signature two and signature three meet the signature combination threshold. Hence, signature two and signature three may be combined and, if the level of confidence of the two signatures together meets the rule threshold, then a rule may be established for the combination of signature two and signature three together. Signature four does not meet the combination threshold and is thus not available for combination with another signature to meet the rule threshold. The rule establishment threshold and the signature combination threshold for this example are shown below in Table 2A. The example is shown below in Table 2B.

TABLE 2A

Threshold Values

| Rule Establishment Threshold | Signature Combination Threshold |
|---|---|
| 95% | 80% |

TABLE 2B

Rule Establishment

| Signature | First Frequency | Second Frequency | Support | Level of Confidence | Rule Established (Y/N) | Available for Combination (Y/N) |
|---|---|---|---|---|---|---|
| S1 | 25 | 25 | 25 | 100% | Y | Y |
| S2 | 47 | 50 | 47 | 94% | N | Y |
| S3 | 45 | 50 | 45 | 90% | N | Y |
| S4 | 28 | 40 | 28 | 70% | N | N |
| S2 + S3 | 19 | 20 | 19 | 95% | Y | Y |

The security action module 206 may apply the rule established by the statistics module 204 to identify new malicious websites. In some embodiments, the security action module 206 may utilize a crawling tool, data scraping tool, or other identification tool to search code or content from websites, apply the rule, and identify new malicious websites containing the one or more signatures that form the basis of the rule. Once found, the identity of these websites may be stored in a database. Browsing sessions on a user device may be monitored and if a browser attempts to contact one of these new malicious websites, a security action may be performed.

In other embodiments, the security action module 206 may monitor browsing sessions on a user device in real time. For example, the security action module 206 may run a check on a website when it is opened by the consumer. If a rule exists that websites containing a specific sentence of prose from an "about us" page are malicious, the security action module 206 may apply the rule to the newly opened website to determine whether the website contains the specific sentence of prose from the "about us" page. If the security action module 206 determines that the website is malicious because it contains the specific sentence, the security action module 206 may then perform a security action.

The security action module 206 may perform a security action to protect consumers from websites identified as malicious. In some embodiments, the security action may include providing a notification to a customer attempting to contact the website that the website may be fraudulent. In other embodiments, the security action may include preventing a customer from accessing the website or restricting access to certain portions of the website. In other embodiments, the security action may include preventing a customer from making any purchases from the website or preventing a user from inputting information or uploading data into the website.

In these and other embodiments, before the security action is performed, the security action module 206 may select the security action to perform based on the level of confidence and the first frequency of the rule. For example, if the rule has high confidence and high support, the security action selected may be blocking the website completely. If the rule has lower confidence and lower support, and the security action selected may be notifying the user that the website is potentially malicious. An example of a selection matrix is shown below in Table 3.

TABLE 3

Security Action Selection

| Security Action | First Frequency (Support) | Level of Confidence |
|---|---|---|
| Blocking Website | >30 | 95%-100% |
| Restricting Access to the Website (Partially) | $30 > f_1 > 20$ | 95%-100% |
| Preventing User Input | $20 > f_1 > 10$ | 95-100% |
| Preventing Consumer Purchases | $20 > f_1 > 10$ | 90-95% |
| Notifying User | <10 | 85%-100% |
| No Security Action Performed | <10 | <85% |

Thus, signatures from the artifacts identified in known malicious websites may be used to determine whether a new website is malicious. Once a website is determined to be malicious, steps may be taken to protect the customer and/or a user device belonging to the customer, from the malicious website.

Modifications, additions, or omissions may be made to the security application 200 without departing from the scope of the present disclosure. For example, the security application 200 may include additional components similar to the components illustrated in FIG. 2 such that each may be configured similarly to the components illustrated in FIG. 2. Further, in some embodiments, the functionality of the security application 200 may be spread across two or more separate security applications, such as is shown in FIG. 1.

Figure 3:
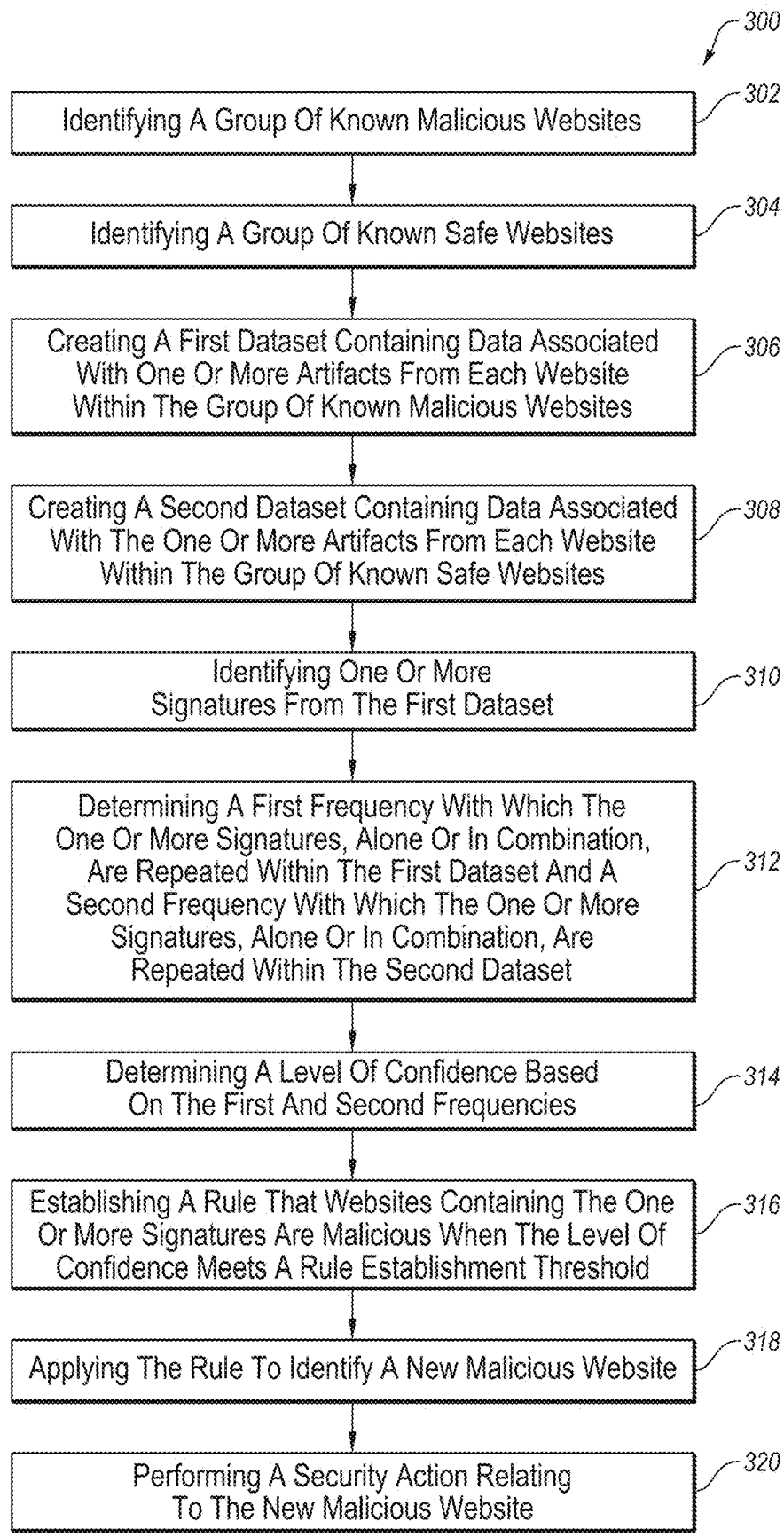
FIG. 3 is a flowchart of an example method for protecting against malicious websites using repetitive data signatures.

FIG. 3 illustrates a flowchart of an example method for protecting against malicious websites using repetitive data signatures. The method 300 may be performed, in some embodiments, by a device or system, such as by the security applications 112 or 118 of FIG. 1 or the security application 200 of FIG. 2. In these and other embodiments, the method 300 may be performed by one or more processors based on one or more computer-readable instructions stored on one or more non-transitory computer-readable media.

The method 300 may include, at action 302, identifying a group of known malicious websites. Websites may be identified as malicious via a crawling tool and/or via website reputation trackers.

The method 300 may include, at action 304, identifying a group of known safe websites. Safe websites may also be identified as safe via a crawling tool and/or via website reputation trackers.

The method 300 may include, at action 306, creating a first dataset containing data associated with one or more artifacts from each website within the group of known malicious websites. In some embodiments, the one or more artifacts may be content elements. In these embodiments, the one or more artifacts may be "about us" pages, "contact us" pages, payment processing pages, FAQ pages, and/or Privacy Policies. In some embodiments, the one or more artifacts may be code elements. In these embodiments, the one or more artifacts may be code used to create the website, a TLS certificate, and/or other code elements. In some embodiments, the one or more artifacts may be code elements and content elements. For example, the extraction module 202 of FIG. 2 may create, at action 306, a first dataset containing data associated with "about us" pages, "contact us" pages, payment processing pages, FAQ pages, privacy policies, and code from a group of known malicious websites.

The method 300 may include, at action 308, creating a second dataset containing data associated with one or more artifacts from each website within the group of known safe websites. In some embodiments, the one or more artifacts may be content elements. In these embodiments, the one or more artifacts may be "about us" pages, "contact us" pages, payment processing pages, FAQ pages, and/or Privacy Policies. In some embodiments, the one or more artifacts may be code elements. In these embodiments, the one or more artifacts may be code used to create the website, a TLS certificate, and/or other code elements. In some embodiments, the one or more artifacts may be code elements and content elements. For example, the extraction module 202 of FIG. 2 may create, at action 306, a first dataset containing data associated with "about us" pages, "contact us" pages, payment processing pages, FAQ pages, privacy policies, and code from a group of known safe websites.

The method 300 may include, at action 310, identifying one or more signatures from the first dataset. In some embodiments, the one or more signatures may be portions of text used in the web page. In these and other embodiments, the one or more signatures may be physical addresses, phone numbers, email addresses, fax numbers, or other contact information. In these and other embodiments, the one or more signatures may be payment processing accounts (e.g., a PayPal® account). In these and other embodiments, the one or more signatures may be an HTML template and/or an identifier for a web analytics client. Additionally or alternatively, the signature may be a public/private key pair for signing the TLS certificate. For example, the extraction module 202 may identify, at action 310, a physical address as a signature from a "contact us" page in the first dataset.

The method 300 may include, at action 312, determining a first frequency with which the one or more signatures, alone or in combination, are repeated within the first dataset and a second frequency with which the one or more signatures, alone or in combination, are repeated within the second dataset. For example, the statistics module 204 in FIG. 2 may determine, at action 312, a frequency with which an email address is repeated within the first dataset and a second frequency with which the email address is repeated within the second dataset.

The method 300 may include, at action 314, determining a level of confidence based on the first and second frequencies. For example, the statistics module 204 of FIG. 2 may determine, at action 314, a level of confidence that a website containing a specific email address is malicious.

The method 300 may include, at action 316, establishing a rule that websites containing the one or more signatures are malicious when the level of confidence meets or exceeds a rule establishment threshold. For example, the statistics module 204 of FIG. 2, at action 316, may establish a rule that a website containing an email address is malicious when the confidence meets a rule establishment threshold confidence value of at least 95%. In some embodiments, a single signature may be identified from the first dataset and the rule may be established based on the level of confidence determined for websites containing the single signature meeting or exceeding the rule establishment threshold. In some embodiments, at least two signatures may be identified from the first dataset and the rule may be established based on the level of confidence determined for websites containing the at least two signatures meeting or exceeding the rule establishment threshold. In these embodiments, the method 300 may further include confirming that a level of confidence for each of at least two signatures meet or exceed a signature combination threshold.

The method 300 may include, at action 318, applying the rule to identify a new malicious website. For example, the security action module 206 of FIG. 2, at action 318, may apply the rule that a website containing an email address is malicious to identify a new malicious website containing that email address.

The method 300 may include, at action 320, performing a security action relating to the new malicious website. In some embodiments, the performed security action may include providing a notification on a device that is attempting to access the new malicious website, or preventing a device from accessing the new malicious website, or preventing a user from entering data into the new malicious website, or preventing a transaction from occurring on the new malicious website. For example, the security action module 206 of FIG. 2, at action 320, may block a malicious website if the website is determined to have a specific phone number that indicates that a website is malicious. In these and other embodiments, the security action performed, at action 320, may be selected based on the level of confidence and the first frequency.

Although the actions of the method 300 are illustrated in FIG. 3 as discrete actions, various actions may be divided into additional actions, combined into fewer actions, reordered, expanded, or eliminated, depending on the desired implementation. Further, it is understood that the method 300 may improve the functioning of a computer system itself. It is common for malicious websites to also be associated with various types of malware, spyware, and tracking domains. Therefore, merely visiting these sites may degrade the functionality of a computing system. Performing a security action which helps users to avoid these malicious websites and/or prevents them from accessing these websites altogether, will therefore protect, and thus, improve the functionality of a computing device. For example, the functioning of the user device 104 of FIG. 1 may itself be improved by the method 300. Continuing the example, the user device 104 may be improved by the method 300 by preventing the user from downloading software or causing the user device 104 to obtain viruses from accessing a malicious website identified through the method 300. These malicious websites, without security actions, may prevent the user device 104 from running optimally and/or may render the user device 104 inoperable. Thus, the method 300 may be employed to improve security and performance of the user device 104.

Also, the method 300 may improve the technical field of malicious website detection. Malicious websites are problems unique to the Internet and the solution provided herein is necessarily rooted in computer technology. Consumers do not have physical access to a malicious website to determine if it is malicious, and these websites often appear to be safe because of their mimicry of safe websites. Identifying repeating signatures to identify malicious websites is a significant improvement over other methods used to perform the same task.

FIG. 4 an example computer system that may be employed in protecting against malicious websites using repetitive data signatures. In some embodiments, the computer system 400 may be part of any of the systems or devices described in this disclosure. For example, the computer system 400 may be part of any of the user device 104 of FIG. 1, the web servers 106a-106n of FIG. 1, and the security server 108 of FIG. 1.

The computer system 400 may include a processor 402, a memory 404, a file system 406, a communication unit 408, an operating system 410, a user interface 412, and an application 414, which all may be communicatively coupled. In some embodiments, the computer system may be, for example, a desktop computer, a client computer, a server computer, a mobile phone, a laptop computer, a smartphone, a smartwatch, a tablet computer, a portable music player, a networking device, or any other computer system.

Generally, the processor 402 may include any suitable special-purpose or general-purpose computer, computing entity, or processing device including various computer hardware or software applications and may be configured to execute instructions stored on any applicable computer-readable storage media. For example, the processor 402 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof. In some embodiments, the processor 402 may interpret and/or execute program instructions and/or process data stored in the memory 404 and/or the file system 406. In some embodiments, the processor 402 may fetch program instructions from the file system 406 and load the program instructions into the memory 404. After the program instructions are loaded into the memory 404, the processor 402 may execute the program instructions. In some embodiments, the instructions may include the processor 402 performing one or more of the actions of the methods disclosed herein.

The memory 404 and the file system 406 may include computer-readable storage media for carrying or having stored thereon computer-executable instructions or data structures. Such computer-readable storage media may be any available non-transitory media that may be accessed by a general-purpose or special-purpose computer, such as the processor 402. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 402 to perform a certain operation or group of operations, such as one or more of the actions of the methods disclosed herein. These computer-executable instructions may be included, for example, in the operating system 410, in one or more applications, such as the security application 200, the security application 112, the security application 118, or in some combination thereof.

The communication unit 408 may include any component, device, system, or combination thereof configured to transmit or receive information over a network, such as the network 102 of FIG. 1. In some embodiments, the communication unit 408 may communicate with other devices at other locations, the same location, or even other components within the same system. For example, the communication unit 408 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, a cellular communication device, etc.), and/or the like. The communication unit 408 may permit data to be exchanged with a network and/or any other devices or systems, such as those described in the present disclosure.

The operating system 410 may be configured to manage hardware and software resources of the computer system 400 and configured to provide common services for the computer system 400.

The user interface 412 may include any device configured to allow a user to interface with the computer system 400. For example, the user interface 412 may include a display, such as an LCD, LED, or other display, that is configured to present video, text, application user interfaces, and other data as directed by the processor 402. The user interface 412 may further include a mouse, a track pad, a keyboard, a touchscreen, volume controls, other buttons, a speaker, a microphone, a camera, any peripheral device, or other input or output device. The user interface 412 may receive input from a user and provide the input to the processor 402. Similarly, the user interface 412 may present output to a user.

The application 414 may be one or more computer-readable instructions stored on one or more non-transitory computer-readable media, such as the memory 404 or the file system 406, that, when executed by the processor 402, is configured to perform one or more of the actions of the methods disclosed herein. In some embodiments, the application 414 may be part of the operating system 410 or may be part of an application of the computer system 400, or may be some combination thereof. In some embodiments, the application 414 may function any one of the security application 200, the security application 112, or the security application 118.

Modifications, additions, or omissions may be made to the computer system 400 without departing from the scope of the present disclosure. For example, although each is illustrated as a single component in FIG. 4, any of the components 402-414 of the computer system 400 may include multiple similar components that function collectively and are communicatively coupled. Further, although illustrated as a single computer system, it is understood that the computer system 400 may include multiple physical or virtual computer systems that are networked together, such as in a cloud computing environment, a multitenancy environment, or a virtualization environment.

As indicated above, the embodiments described herein may include the use of a special purpose or general purpose computer (e.g., the processor 402 of FIG. 4) including various computer hardware or software applications, as discussed in greater detail below. Further, as indicated above, embodiments described herein may be implemented using computer-readable media (e.g., the memory 404 or file system 406 of FIG. 4) for carrying or having computer-executable instructions or data structures stored thereon.

In some embodiments, the different components and applications described herein may be implemented as objects or processes that execute on a computing system (e.g., as separate threads). While some of the methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely example representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the summary, detailed description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absent a showing that the terms "first," "second," "third," etc., connote a specific order, these terms should not be understood to connote a specific order. Furthermore, absent a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

The foregoing description, for purpose of explanation, has been described with reference to specific embodiments. However, the illustrative discussions above are not intended to be exhaustive or to limit the invention as claimed to the precise forms disclosed. Many modifications and variations are possible in view of the above teachings. The embodiments were chosen and described to explain practical applications, to thereby enable others skilled in the art to utilize the invention as claimed and various embodiments with various modifications as may be suited to the particular use contemplated.

The invention claimed is:

1. A computer-implemented method for protecting against malicious websites using repetitive data signatures, at least a portion of the method being performed by a computing device comprising one or more processors, the method comprising:
   identifying a group of known malicious websites;
   identifying a group of known safe websites;
   creating a first dataset containing data associated with one or more artifacts from each website within the group of known malicious websites, the one or more artifacts from each website within the group of known malicious websites including at least one of website code elements or website content elements;
   creating a second dataset containing data associated with one or more artifacts from each website within the group of known safe websites, the one or more artifacts from each website within the group of known safe websites including at least one of website code elements or website content elements;
   identifying one or more signatures from the first dataset;
   determining a first frequency with which the one or more signatures, alone or in combination, are repeated within the first dataset, the first frequency representing a number of times the one or more signatures appear in the group of known malicious websites;
   determining a second frequency with which the one or more signatures, alone or in combination, are repeated within the second dataset, the second frequency representing a number of times the one or more signatures appear in the group of known safe websites;
   determining a level of confidence based on the first and second frequencies;
   establishing a rule that websites containing the one or more signatures are malicious when the level of confidence meets or exceeds a rule establishment threshold;
   applying the rule to identify a new malicious website; and
   performing a security action relating to the new malicious website.

2. The computer-implemented method of claim 1, wherein the one or more artifacts comprise content from a web page.

3. The computer-implemented method of claim 2, wherein the web page is an "about us" type web page that provides general information about the website and the one or more signatures comprise a portion of text used in the web page.

4. The computer-implemented method of claim 2, wherein the web page is a "contact us" type web page that provides location information relating to the website and the one or more signatures comprise an email address or a phone number or a physical address.

5. The computer-implemented method of claim 2, wherein the web page is a payment processing web page and the one or more signatures comprise a payment processing account.

6. The computer-implemented method of claim 2, wherein the web page is a "frequently asked questions" type web page and the one or more signatures comprise a portion of text used in the web page.

7. The computer-implemented method of claim 2, wherein the web page publishes a privacy policy for the website and the one or more signatures comprise a portion of text used in the privacy policy.

8. The computer-implemented method of claim 1, wherein the one or more artifacts comprise code used to create the website and the one or more signatures comprise a Hypertext Markup Language template.

9. The computer-implemented method of claim 1, wherein the one or more artifacts comprise a Transport Layer Security (TLS) certificate and the one or more signatures comprise a public/private key pair for signing the TLS certificate.

10. The computer-implemented method of claim 1, wherein the one or more artifacts comprise code used to create the website and the one or more signatures comprises an identifier for a web analytics client.

11. The computer-implemented method of claim 1, wherein the security action includes providing a notification on a device that is attempting to access the new malicious website.

12. The computer-implemented method of claim 1, wherein the security action includes preventing a device from accessing the new malicious website.

13. The computer-implemented method of claim 1, wherein the security action includes preventing a user from entering data into the new malicious website.

14. The computer-implemented method of claim 1, wherein the security action includes preventing a transaction from occurring on the new malicious website.

15. The computer-implemented method of claim 1, wherein a single signature is identified from the first dataset and the rule is established based on a level of confidence determined for websites containing the single signature meeting or exceeding the rule establishment threshold.

16. The computer-implemented method of claim 1, wherein at least two signatures are identified from the first dataset and the rule is established based on a level of confidence determined for websites containing the at least two signatures meeting or exceeding the rule establishment threshold.

17. The computer-implemented method of claim 16, further comprising confirming that a level of confidence for each of the at least two signatures meet or exceed a signature combination threshold.

18. The computer-implemented method of claim 1, wherein the method further comprises:
establishing the first frequency as a support of the rule, wherein the rule is established when the support of the rule meets or exceeds a rule support threshold.

19. One or more non-transitory computer-readable media comprising one or more computer-readable instructions that, when executed by one or more processors of a computing device, cause the computing device to perform a method for protecting against malicious websites using repetitive data signatures, the method comprising:
identifying a group of known malicious websites;
identifying a group of known safe websites;
creating a first dataset containing data associated with one or more artifacts from each website within the group of known malicious websites, the one or more artifacts from each website within the group of known malicious websites including at least one of website code elements or website content elements;
creating a second dataset containing data associated with one or more artifacts from each website within the group of known safe websites, the one or more artifacts from each website within the group of known safe websites including at least one of website code elements or website content elements;
identifying one or more signatures from the first dataset;
determining a first frequency with which the one or more signatures, alone or in combination, are repeated within the first dataset, the first frequency representing a number of times the one or more signatures appear in the group of known malicious websites;
determining a second frequency with which the one or more signatures, alone or in combination, are repeated within the second dataset, the second frequency representing a number of times the one or more signatures appear in the group of known safe websites;
determining a level of confidence based on the first and second frequencies;
establishing a rule that websites containing the one or more signatures are malicious when the level of confidence meets or exceeds a rule establishment threshold;
applying the rule to identify a new malicious website; and
performing a security action relating to the new malicious website.

20. A computing device comprising:
one or more processors; and
one or more non-transitory computer-readable media comprising one or more computer-readable instructions that, when executed by the one or more processors, cause the computing device to perform a method for protecting against malicious websites using repetitive data signatures, the method comprising:
identifying a group of known malicious websites;
identifying a group of known safe websites;
creating a first dataset containing data associated with one or more artifacts from each website within the group of known malicious websites, the one or more artifacts from each website within the group of known malicious websites including at least one of website code elements or website content elements;
creating a second dataset containing data associated with one or more artifacts from each website within the group of known safe websites, the one or more artifacts from each website within the group of known safe websites including at least one of website code elements or website content elements;
identifying one or more signatures from the first dataset;
determining a first frequency with which the one or more signatures, alone or in combination, are repeated within the first dataset, the first frequency representing a number of times the one or more signatures appear in the group of known malicious websites;
determining a second frequency with which the one or more signatures, alone or in combination, are repeated within the second dataset, the second frequency representing a number of times the one or more signatures appear in the group of known safe websites;
determining a level of confidence based on the first and second frequencies;
establishing a rule that websites containing the one or more signatures are malicious when the level of confidence meets or exceeds a rule establishment threshold;
applying the rule to identify a new malicious website; and
performing a security action relating to the new malicious website.

* * * * *